Figure 1:
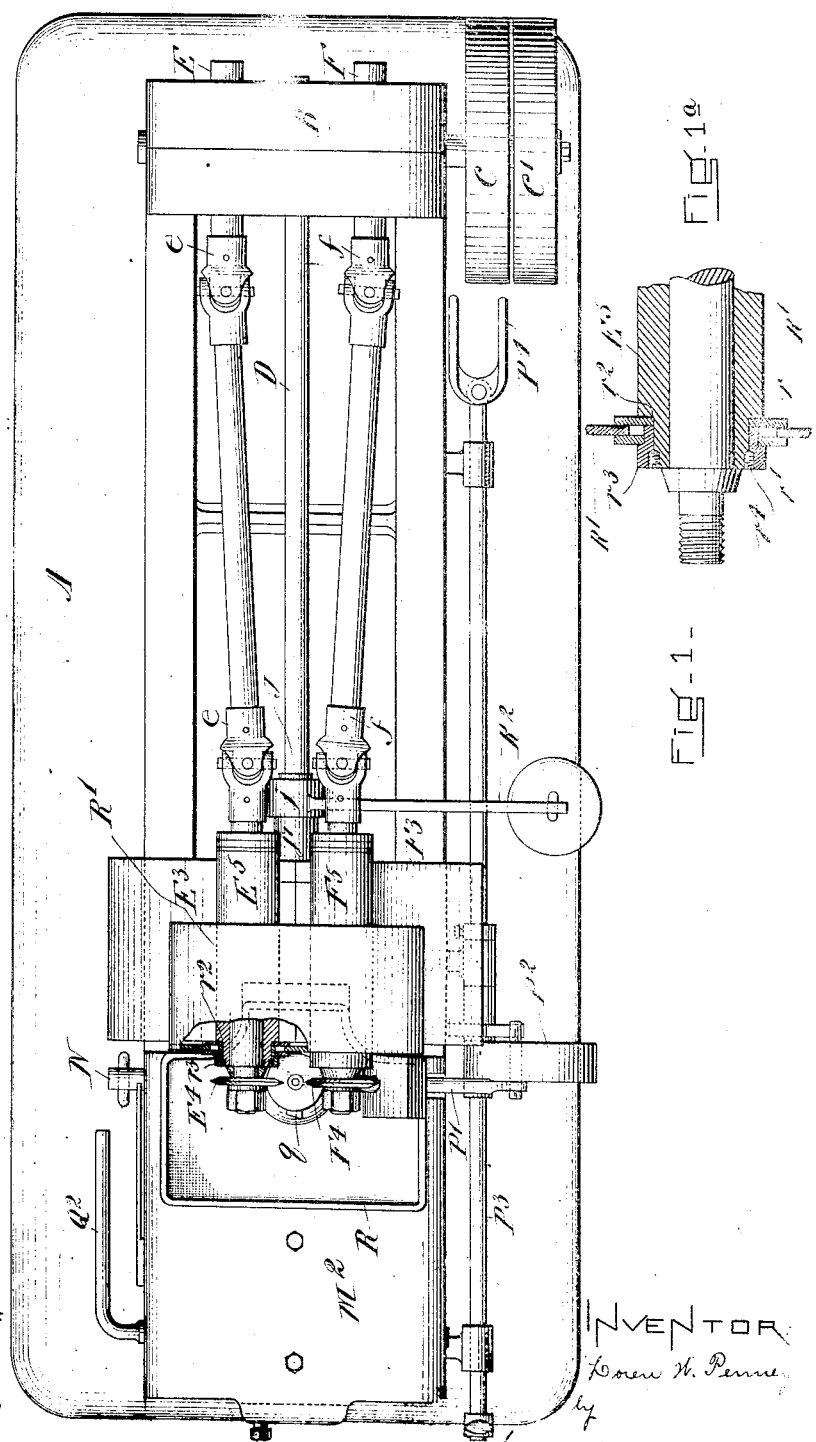

L. W. PENNEY.
GEAR CUTTING MACHINE.
APPLICATION FILED JULY 15, 1909.

1,036,322.

Patented Aug. 20, 1912.
8 SHEETS—SHEET 3.

WITNESSES:
M. E. Flaherty.
J. D. McPherson.

INVENTOR:
Lorenzo W. Penney
by
his Attorneys.

UNITED STATES PATENT OFFICE.

LOREN W. PENNEY, OF NEWTON, MASSACHUSETTS, ASSIGNOR, BY MESNE ASSIGNMENTS, TO SACO-PETTEE COMPANY, OF NEWTON, MASSACHUSETTS, A CORPORATION OF MASSACHUSETTS.

GEAR-CUTTING MACHINE.

1,036,322.　　　　　Specification of Letters Patent.　　Patented Aug. 20, 1912.

Application filed July 15, 1909. Serial No. 507,792.

*To all whom it may concern:*

Be it known that I, LOREN W. PENNEY, of Newton, in the county of Middlesex and State of Massachusetts, a citizen of the United States, have invented a new and useful Improvement in Gear-Cutting Machines, of which the following is a specification.

My invention relates to the cutting of gears, and its embodiment as shown in the drawings, is a machine for cutting beveled gears though it may be otherwise applied. I shall describe it therefore with particular relation to the embodiment shown.

The teeth of a beveled gear are radial and usually somewhat larger at the base than at the top and somewhat thicker at the periphery of the gear than nearer the center. This requires that the cutting tool shall work somewhat off the radius of the blank and at an angle to its axis and its adjustment therefore is a somewhat delicate and difficult matter to secure with accuracy.

My invention is intended to increase the speed with which a gear is cut by using two cutters which cut opposite sides of the grooves at the same time, one cutter working however upon one side of the gear and the other cutter upon the other side; such at least is the present embodiment of my invention. In this machine therefore a single revolution of the blank presents its periphery to both cutting tools in turn so that when a single revolution of the blank has taken place the entire groove between each pair of teeth has been cut out and the teeth have been all finished. The finished gear may then be removed and a new blank substituted, the machine being then started up without any delay other than that due to the necessary removing of the chips and substituting a new blank for the finished gear. While the mechanism shown is especially adapted for use in its present environment portions of it may be utilized to accomplish their especial work in other surroundings. Thus, for example, the tool holders may be used in connection with another form of clutch or clutch rotating mechanism, and the clutch rotating mechanism shown while especially adapted for use with the other parts of the machine may be used in a machine having a single cutter, etc.

My invention will be understood by reference to the drawings in which—

Figure 2:
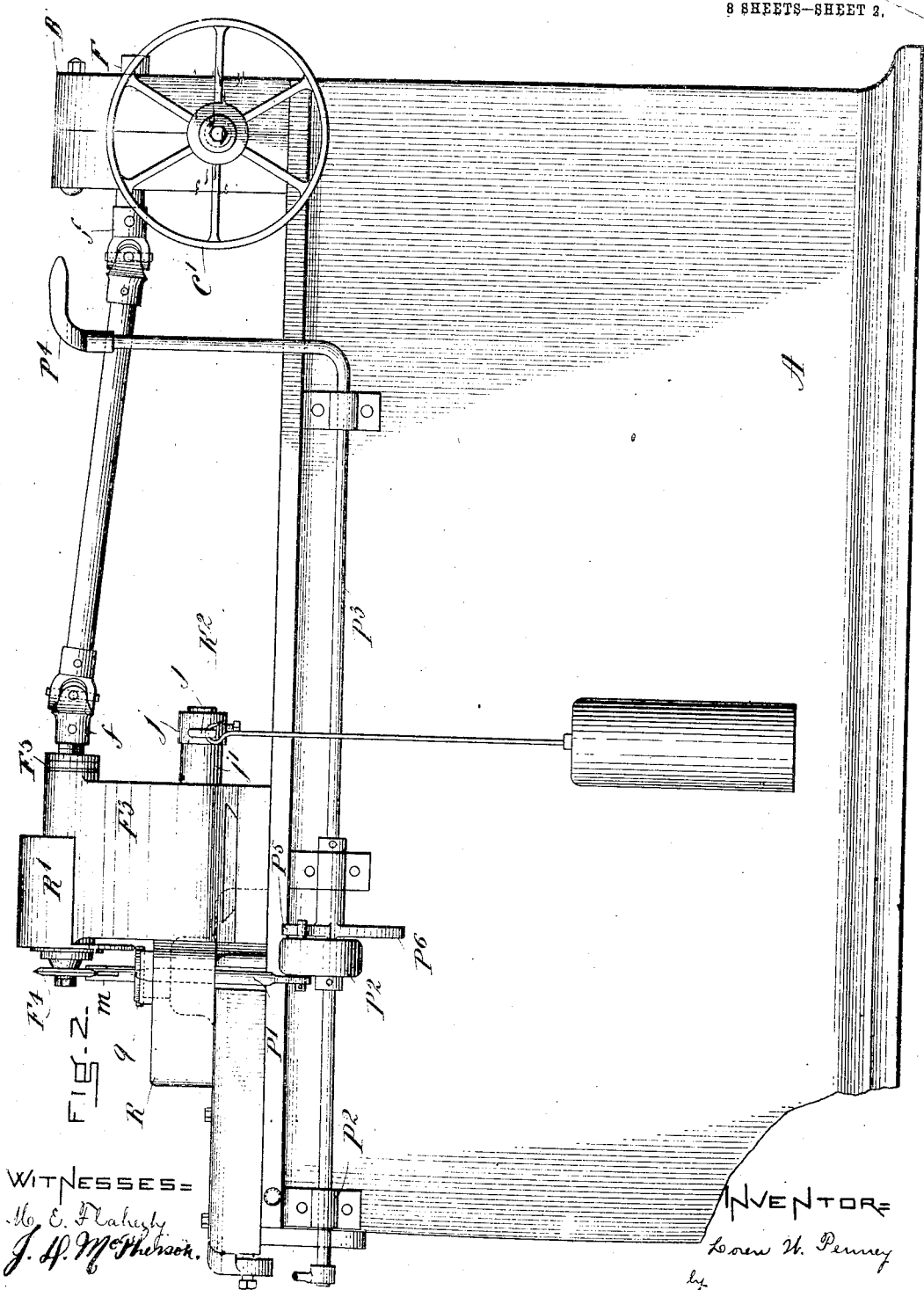
Figure 3:
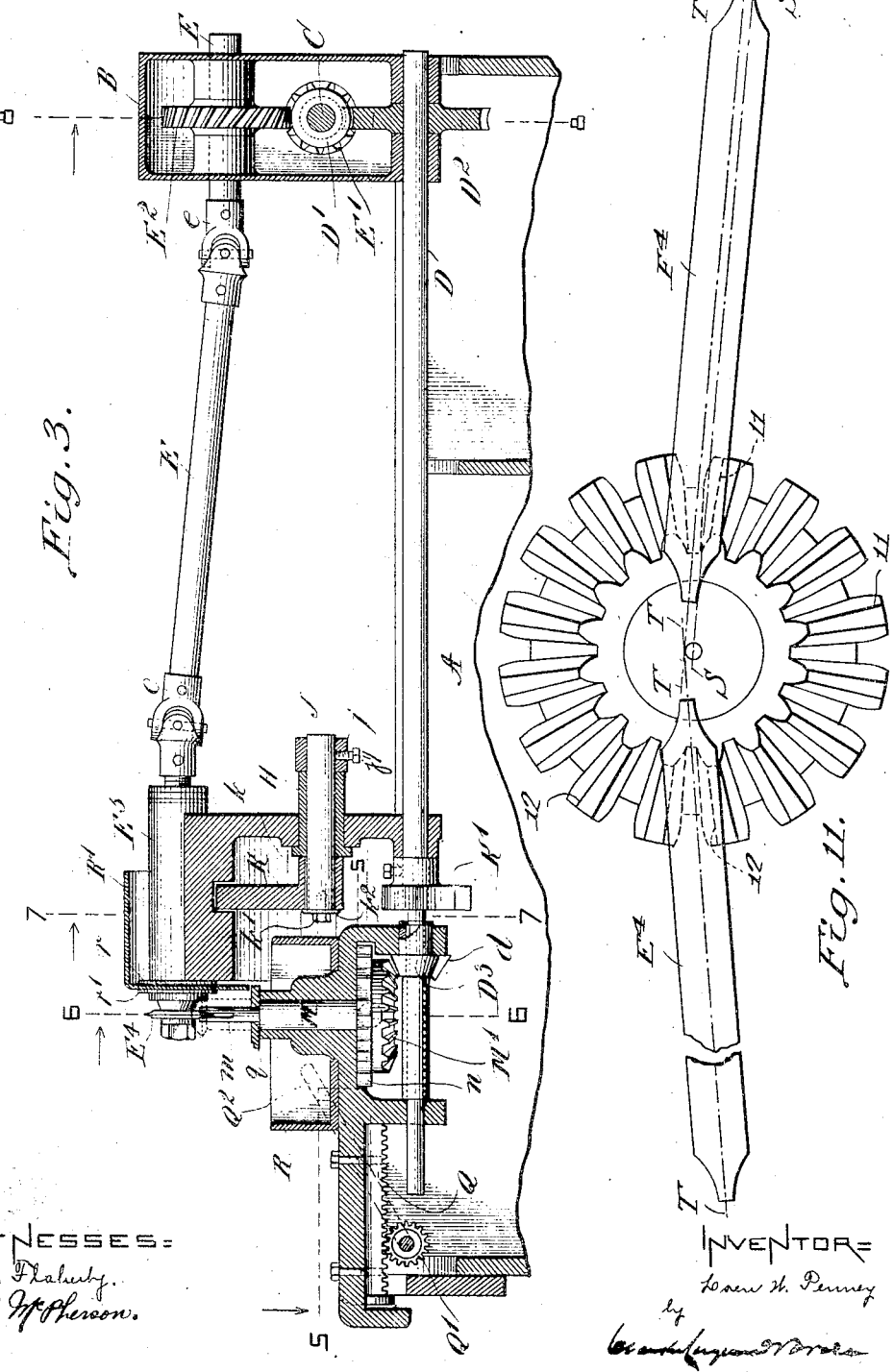
Figure 4:
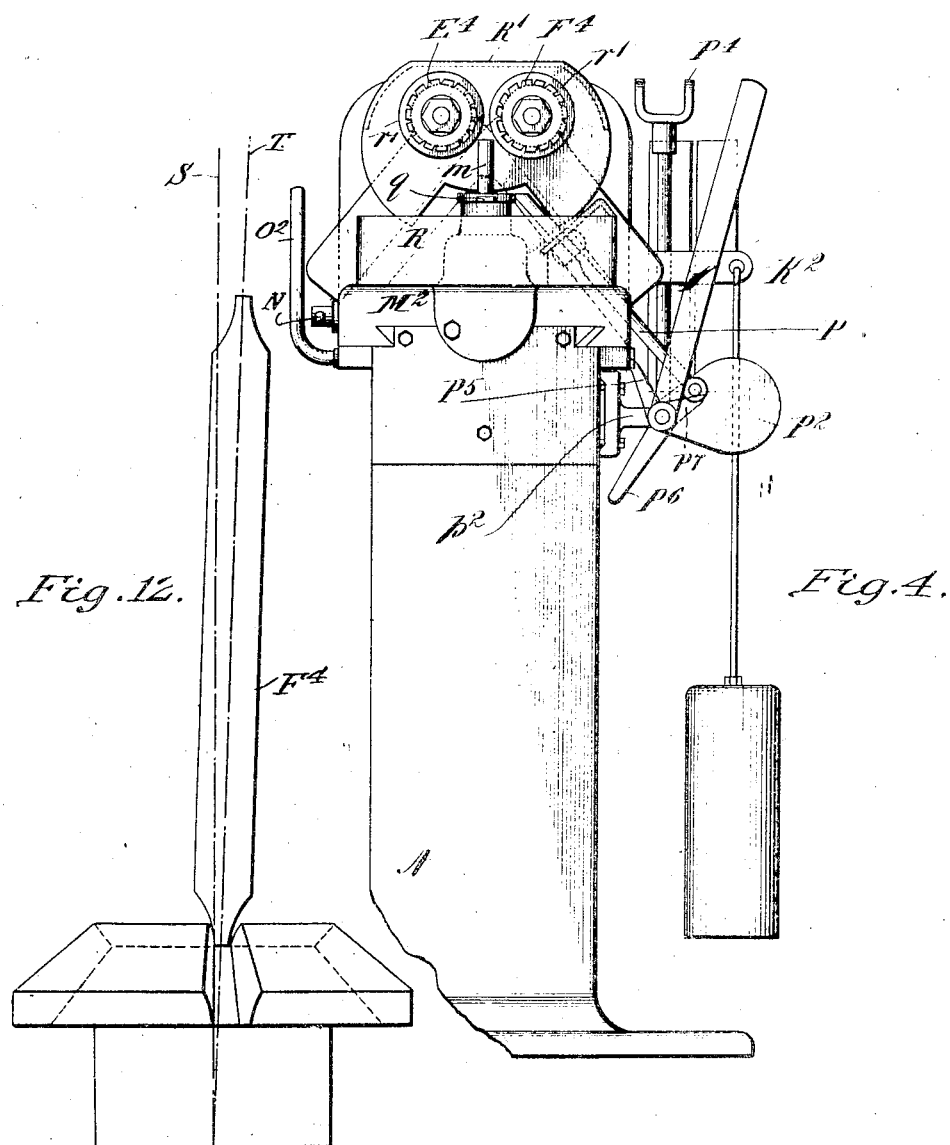
Figure 5:
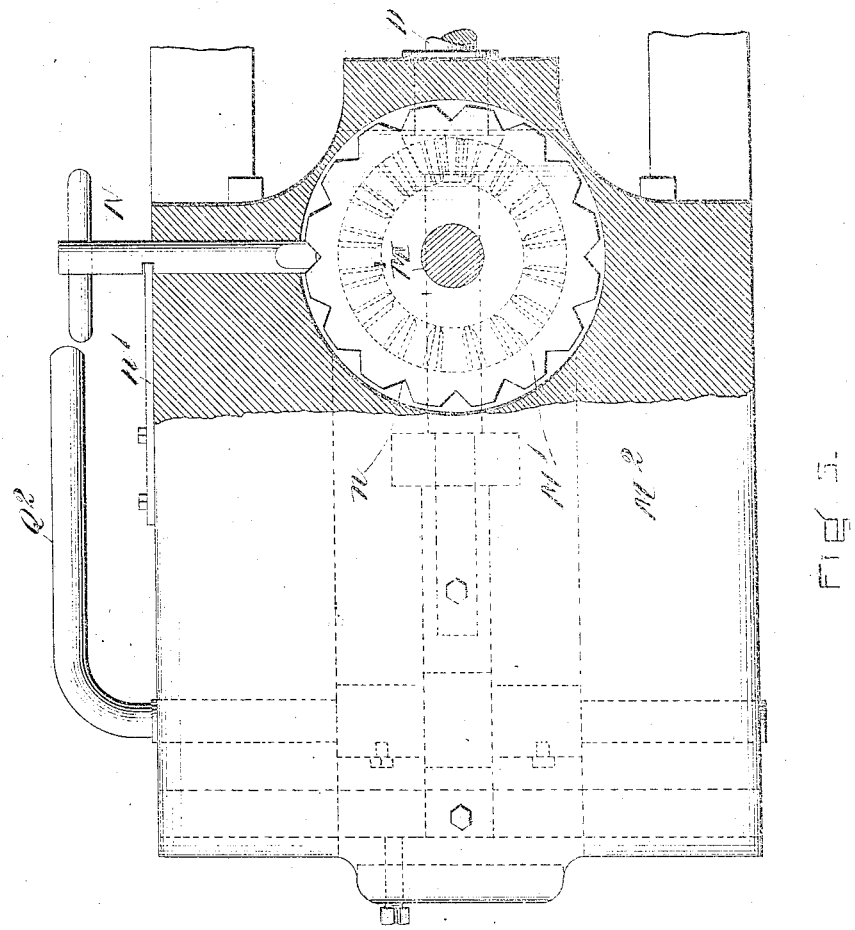
Figure 6:
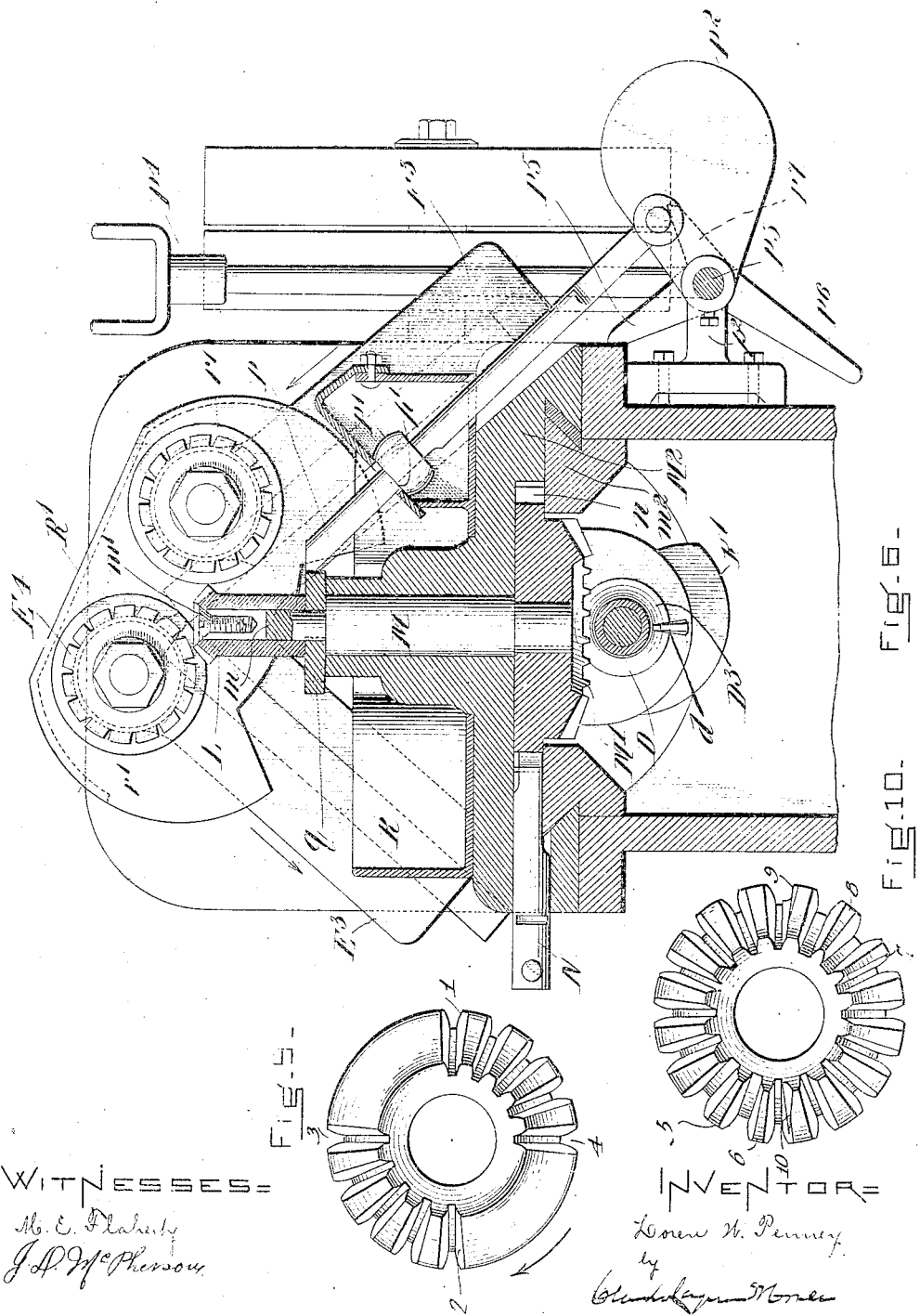
Figure 7:
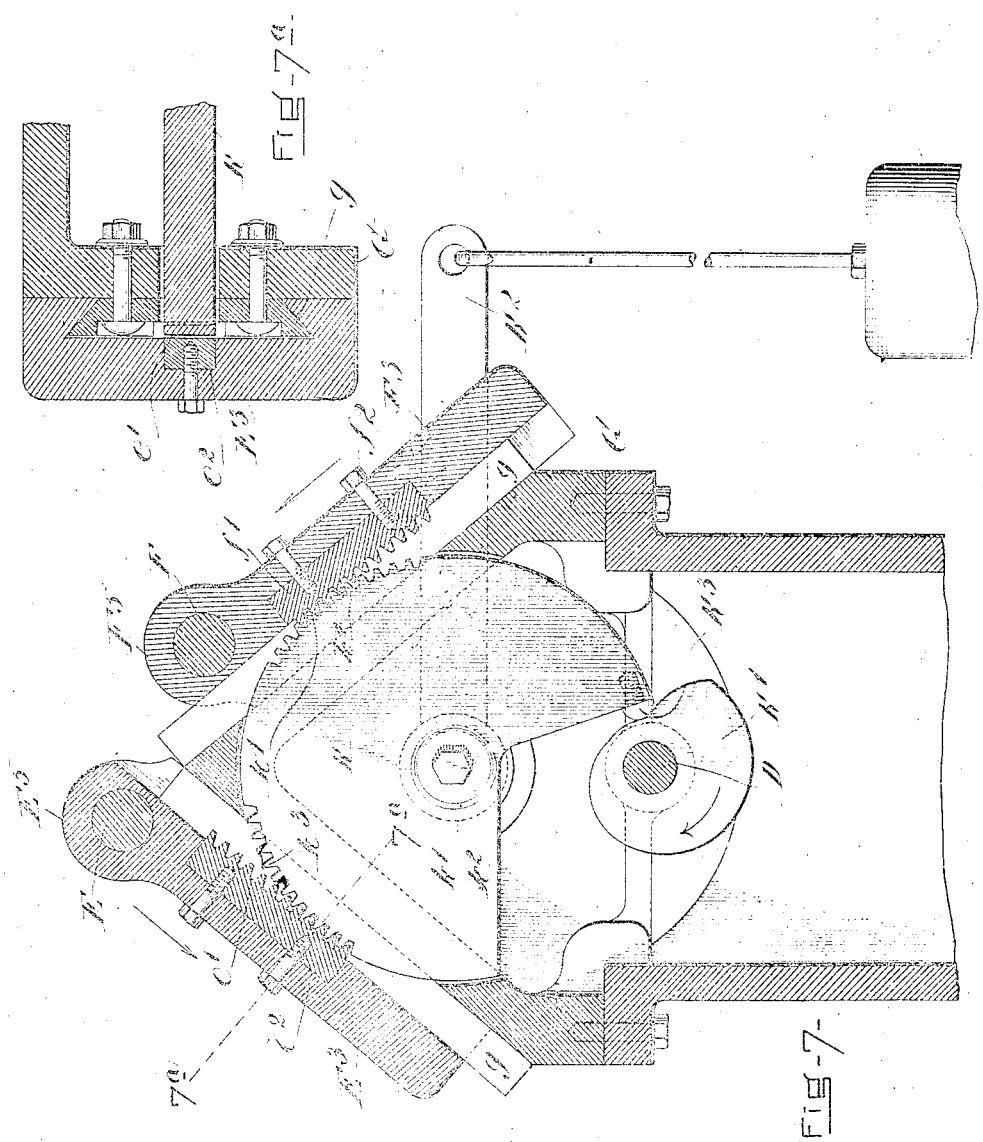
Figure 8:
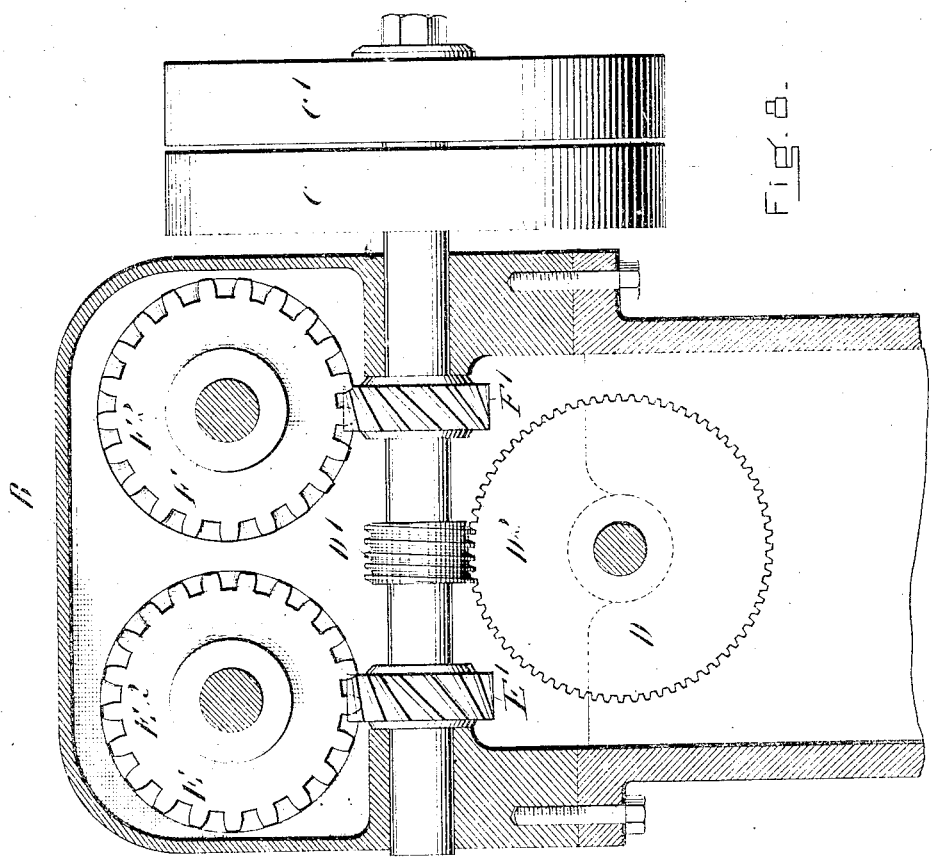

Figure 1 is a plan view of a machine embodying my invention. Fig. 1$^a$ is a sectional detail of the bearings and cover. Fig. 2 is a side elevation thereof. Fig. 3 is a vertical longitudinal section. Fig. 4 is a front elevation. Fig. 5 is an enlarged section on line 5—5 of Fig. 3. Fig. 6 is an enlarged section on line 6—6 of Fig. 3. Fig. 7 is an enlarged section on line 7—7 of Fig. 3. Fig. 7$^a$ is a cross section on line 7$^a$—7$^a$ of Fig. 7. Fig. 8 is an enlarged section on line 8—8 of Fig. 3. Fig. 9 is a plan of a blank which has been rotated a quarter of a revolution under the cutters, and Fig. 10 is a plan of a blank which has been rotated slightly over half a revolution under the cutters. Figs. 11 and 12 are detail views on an enlarged scale illustrating the operation of the cutters on the blank, the parts being shown in plan and elevation respectively in the two figures.

The machine is mounted upon a base A.

B is a box mounted upon the base A and having bearings for the power shaft C as well as for the feed shaft D and the cutter shafts E and F. The shaft carries fast and loose pulleys $c$, $c^1$, and also carries a worm $D^1$ in mesh with a worm gear $D^2$ on the feed shaft. It also carries two spiral gears $E^1$, $F^1$, which mesh with corresponding gears $E^2$, $F^2$, on the cutter shafts E, F. The farther end of each shaft E, F, is mounted in bearings $E^5$, $F^5$, each forming part of a carriage $E^3$, $F^3$, and each shaft carries a cutter $E^4$, $F^4$, which is fastened to its front end by a nut, the shaft being reduced in size to form a shoulder against which the cutter is clamped and being threaded to receive the nut. Each carriage $E^3$, $F^3$, is capable of a movement crosswise the machine and to render each shaft sufficiently flexible to allow this movement each shaft is jointed as at $e$, $f$, with gimbal joints. By this construction considerable latitude of play is allowed at that end of each shaft which carries a cutter, without unduly controlling its movement.

Each carriage $E^3$, $F^3$ is mounted on ways $g$ bolted to the support G which is bolted to the base A. This support on its under side supports the feed shaft D and it also carries a bearing H for a shaft J which is held therein between a collar $j$ with its set screw $j^1$ and the hub $k$ of the segmental rack K which is attached to the shaft J by a screw $k^1$ and washer $k^2$, and an ordinary key.

The rack K has two sets of teeth $k^3$, $k^4$ on its periphery. The support G is slotted and the rack K is of sufficient diameter to project somewhat through it to engage with teeth on the rack bars $e^1$, $f^1$, each attached to the under side of one of the carriages $E^3$, $F^3$, by screws $e^2$, $f^2$. In order to adjust the line of movement of each carriage accurately to line of cut in the blank the holes in the ways $g$ through which the bolts pass are slightly larger than the bolts thus enabling the parts to be set properly when the machine is assembled. After that the carriages require no further adjustment with relation to the racks. The necessary difference in diameter between the holes and the bolts is so slight as to be hardly perceptible in a drawing of the size filed herewith.

The segmental rack K is caused to oscillate in one direction by means of the cam $K^1$ mounted on the feed shaft D, and having been oscillated in one direction by the cam $K^1$, is returned into its original position as the cam will allow by means of the weighted arm $K^2$ which is keyed to the shaft J. A pin $K^3$ is provided in the rack K for engagement by the cam $K^1$. Thus, as the feed shaft D rotates in the direction of the arrow and rotates the cam $K^1$, it causes the segmental rack K to move, thus causing the carriage $E^3$ with its tool to move up and the carriage $F^3$ with its tool to move down on the ways $g$, $g$ in the support G. After the swell of the cam has lifted the bearing surface or pin $K^3$ of the segmental rack the weighted arm $K^2$ keeps it in engagement with the cam and restores it to its original position ready to be moved again by the cam. It will be understood that during this time the cutters are in active rotation and are operating upon the blank. This movement of the tool carriers resulting from the movement of the cam is the feed movement by which the cutting tool is caused to engage with and cut the necessary grooves in the blank.

The chuck by means of which the work is supported, and the chuck feeding mechanism are shown more especially in Figs. 5 and 6. The chuck should be proportioned according to the kind of blank to be cut, that is, whether it is a simple beveled blank or a blank with a hub such as is shown at L in Fig. 6, or otherwise. In either case, however, the chuck comprises a vertical shaft M carrying at its lower end a beveled gear $M^1$ of peculiar construction and at its upper end any well known means of clamping the blank thereto. For example, the form of chuck shown comprises a split post $m$ of a diameter according to the blank to be held, into which a conical headed screw $m^1$ is screwed in order to spread the sections of the post. The chuck is mounted in bearings on a slide $M^2$ which may be moved toward and from the tools on the base A, guide ways $m^2$ being provided for the purpose.

I have referred above to the fact that the gear $M^1$ is of peculiar construction. The feed shaft D carries a gear $D^3$ having a single tooth and the gear $M^1$ is provided with teeth sufficiently far apart to allow the single tooth $d$ of the gear $D^3$ to enter the space between two teeth, move the gear $M^1$ the space of one tooth and then pass out from between the teeth. Thus the chuck M will be rotated intermittently a given distance whenever the feed shaft D makes one revolution, that is, whenever the tooth $d$ engages the gear $M^1$. To lock the chuck in place except when being so moved I provide a pin N which is adapted to enter notches $n$ in the periphery of the gear $M^1$ (see Fig. 5). The pin is normally held in place in one of these notches by means of a spring $n^1$ attached to the side of the base A. The sides of the notches $n$ however are so shaped with relation to the shape of the end of the pin N that when power is applied through the shaft D to turn the crank the pin will ride up the side of the notch in which it is, against the force of the spring $n^1$ and spring into the next notch, thus again locking the chuck in place.

In order to stop the machine automatically when an entire revolution of the blank has taken place, and the gear has been cut, I have provided a stop motion which I will now describe.

The vertical shaft M forming part of the chuck carries near its upper end a cam $q$ which is keyed to the shaft so that it is rotated thereby. An arm P mounted in a bearing $P^1$ has a shoulder $p^1$ to engage the bearing $P^1$ so that normally its upper end is locked in the path of the cam $q$. The lower end of this arm is pivoted to a rocker arm $P^7$ mounted on a rock shaft $P^3$ which carries at its farther end a belt shipper $P^4$. The rock shaft is mounted in bearings $p^2$ on the side of the base A (see Fig. 2). The rock shaft $P^3$ also carries a weighted arm $P^2$ and two other rocker arms $P^5$ and $P^6$ which act as stops. As shown in Fig. 6 the arm $P^5$ engages the frame and the rocker arm $P^6$ is in position whereby it will allow the rock shaft to be given a slight rotation sufficient to throw the shipper and carry the belt from the fast to the loose pulley, and when this has been accomplished it strikes the base A and prevents further rotation of the rock shaft and movement of the shipper. The operation of these parts of the machine is as follows. When the blank has been rotated substantially an entire revolution so that the entire blank has been presented to both cutters the cam $q$ engages the arm P and lifts it slightly thus unlatching it from the bearing P¹ and allowing it to fall. The weighted arm P² is thus allowed to drop and, turning the rock shaft P³, ships the belt and stops the machine.

In order to move the work in and out from its position under the tools the slide M² is moved toward and from the support by means of a rack Q on the under side of the slide which is operated by a pinion Q¹ turned by a handle Q².

In order to receive the chips I provide a pan R which fits about the chuck as shown, and in order to protect the bearings of the tools from dust I have provided a cover R¹. This cover has two openings through which project portions of the bearings E⁵, F⁵. These openings are somewhat larger than the bearings so as to allow these parts free play, and the bearings are centered to a certain extent in them by means of two washers $r$, $r^1$ lying about the ends of the bearings, one lying within the cover and one outside of it. Each inside washer $r$ abuts against a shoulder $r^2$ on its bearing and the outer washer $r^1$ against the face of the cover. A collar $r^3$ passes through the outside washer $r^1$ which has an opening slightly larger than that of the inside washer and abuts against the inside washer. It has a shoulder which binds against the outside washer and it is held in place by screws $r^4$ by which it is keyed to the carriage. The washers are sufficiently large to protect the interior of the cover from the entrance of dust. (See Fig. 1ᵃ.)

In the operation of this machine the blank is placed on the chuck and fastened thereto in some convenient way, as for example, in the manner shown. The cutting tools are then in position shown in Fig. 6 where the tool E⁴ is about to begin its work and cut downward and the tool F⁴ is about to begin its work and cut upward. In Fig. 9 is shown a blank partially cut. These tools E⁴, F⁴ are set so that they finish opposite sides of the grooves, that is to say, referring to Fig. 9 and supposing it to be an enlarged view of the blank which is being cut as referred to in Fig. 6, the tool F⁴ has just finished cutting the surface 1 and the tool E⁴ has just finished cutting the surface 2. The process of cutting and feeding goes on, the blank moving in the direction of the arrow until the groove 3 arrives under cutter F⁴ and the groove 4 under the cutter E⁴. It will be noted that the cutter F⁴ continues to cut and finish the side of each groove corresponding to the side 1 as marked in Fig. 9, and the cutter E⁴ to cut and finish the side of each groove corresponding to the side marked 2 in Fig. 9.

When the blank has been rotated half a revolution each tooth is half finished and during the remainder of the rotation of the blank each tool is finishing a tooth. Referring to Fig. 10 it will be seen that the teeth 5, 6, 7 and 8 are finished; in 9 and 10 finishing has been interrupted and the other teeth are only half finished and are awaiting their turn to be finished, the finishing of a groove completing the cutting of a tooth. When the rotation of the chuck has been completed the cam $q$ engages the end of the arm P and unlatches it so that the belt is shipped and the machine stopped. The two cutters thus travel, generally speaking, in substantially though not exactly the same plane and that plane is not radial to the chuck but parallel to the plane of the axis of the chuck. The cutters themselves are at a slight angle to the axis of the chuck so as to give the right bevel to the wall of the finished tooth. The arrangement and operation of these parts will be most clearly understood by reference to Figs. 11 and 12, in which the lines S—S represent vertical planes through the axis of the chuck coincident with the lower or inner corners or edges of the teeth, while the lines T—T represent planes through the centers of the teeth. In Fig. 11 the lateral faces of the teeth which are cut by the tool F⁴ are indicated by the numeral 11 while the opposite lateral faces, which are cut by the tool E⁴, are indicated by the numeral 12. The sides of the teeth as finished are radial to the axis of the chuck throughout, but inasmuch as these sides are cut by the sides of the tools it follows that the middle vertical planes of these tools must lie in planes slightly offset from the axis of the chuck as indicated by the lines T—T in Fig. 11. Moreover, in order to approximate as closely as possible the theoretically correct form of the sides of the teeth by the use of a rotating milling cutter moving in a straight radial line, and at the same time to permit of the use of tools which will cut freely and whose form can be preserved by grinding it has been found to be of great advantage to arrange these tools or cutters with their central planes at a slight angle to the vertical or to the axis of the chuck, as clearly illustrated by the angle between the lines T—T and S—S in Fig. 12.

What I claim as my invention is:

1. In a gear cutter, the combination with a rotating gear holder, of two tool carriers, means for rotating them and means for causing them to travel automatically across the line of work during the cutting operation substantially in planes parallel to but at one side of the axis of said gear holder.

2. In a gear cutter, the combination with a chuck, of a rotary cutter arranged at an inclination to the axis of said chuck, and means for moving said cutter substantially in a plane parallel to but lying at one side of said axis.

3. In a gear cutter, the combination with a chuck, of a pair of rotary cutters each arranged at an inclination to the axis of said chuck, and means for moving said cutters substantially in the planes parallel to but lying at one side of said axis.

4. A machine for cutting beveled gears comprising an intermittently rotating chuck, a pair of rotary cutters located on opposite sides of said chuck, and means for moving each of said cutters in a substantially rectilinear path relative to the blank held by said chuck, said cutters being arranged respectively to operate upon opposite sides of each of the teeth formed on said blank.

5. A machine for cutting beveled gears comprising two tool carriers each carrying a cutter, means for rotating said tool carriers, an intermittently rotating chuck, said tool carriers being located with relation to said chuck upon opposite sides of the blank held thereby, and means for moving said tool carriers automatically toward the axis of the chuck during the cutting operation to cause each of said tools carried thereby to operate upon opposite sides of each of the teeth formed on said blank.

6. A machine for cutting beveled gears comprising two tool carriers and an intermittently rotary chuck, said tool carriers being located on opposite sides of said chuck and being adjusted with relation to the axis of said chuck to form teeth upon a blank carried by said chuck by respectively cutting the metal from opposite sides of each of said teeth, in combination with means whereby said cutters will be caused to travel automatically in a path across the blank during the cutting operation.

7. In a gear cutter, two tool carriers each carrying a cutter, means for rotating said tool carriers, an intermittently rotating chuck, means for rotating it intermittently, and automatic means for feeding said tool carriers alternately in opposite directions toward and from the axis of said chuck.

8. In a gear cutter, two tool carriers, means for rotating them, and means for feeding them comprising two carriages each having a bearing for one of said tool carriers, and means for reciprocating said carriages alternately in opposite directions toward and from the work during the cutting operation, said means comprising an oscillating rack and means whereby it may be oscillated.

9. In a gear cutter, two tool carriers, means for rotating them and means for feeding them to the work comprising two carriages each having a bearing for one of said tool carriers and means for automatically reciprocating said carriages alternately in opposite directions toward and from the work, said means comprising an oscillating rack, a cam adapted to oscillate said rack and means for holding said rack in engagement with said cam.

10. In a gear cutter, two tool carriers, means for rotating them and means for feeding them to the work comprising two carriages each having a bearing for one of said tool carriers, and means for automatically reciprocating said carriages alternately in opposite directions toward and from the work comprising an oscillating rack and a rack attached to each carriage in engagement with said oscillating rack, as described.

11. In a gear cutter, a chuck, two tool carriers located respectively on opposite sides of said chuck, means for rotating said tool carriers, and automatic means for causing them to travel toward the chuck in substantially rectilinear paths.

12. In a gear cutter, a chuck, two tool holders, one located on each side of said chuck, means for rotating said tool holders, and means for causing them to travel toward the chuck in substantially rectilinear paths forming acute angles to the axis of the chuck.

13. In a gear cutter, a power shaft, a feed shaft and tool carrier shafts, connections between said power shaft and said feed and tool carrier shafts whereby the rotation of said power shaft will cause the rotation of said feed and tool carrier shafts, means for supporting and feeding the work connected to said feed shaft and means for feeding the tools on the tool carrier shafts to the work also connected to said feed shaft, said means comprising guideways at an acute angle to the axis of the work support, carriages carrying said tool carriers thereon adapted to be reciprocated on said guideways, and means for reciprocating said carriages.

14. In a gear cutter, in combination, tool carriers, means whereby they are rotated, a chuck, means whereby said tool carriers are fed toward and from the chuck comprising carriages each carrying a tool carrier and a rack, an oscillating rack engaging said carriage racks, means for causing said oscillating rack to oscillate comprising a cam shaft carrying a cam, and means for feeding said chuck comprising an imperfect gear located on said cam shaft and a gear carried by said chuck.

15. In a gear cutter, in combination, tool carriers, means whereby they are rotated, a chuck, means whereby said tool carriers are fed toward and from the chuck comprising carriages each carrying a tool carrier and a rack, an oscillating rack engaging said carriage racks, means for causing said oscillating rack to oscillate comprising a cam shaft carrying a cam, means for feeding said chuck comprising an imperfect gear located on said cam shaft and a gear carried by said chuck, and means for locking said chuck.

16. In a gear cutter, in combination, tool carriers, means whereby they are rotated, a chuck, means whereby said tool carriers are fed toward and from the chuck comprising carriages each carrying a tool carrier and a rack, an oscillating rack engaging said carriage racks, means for causing said oscillating rack to oscillate comprising a cam shaft carrying a cam, means for feeding said chuck comprising an imperfect gear located on said cam shaft and a gear carried by said chuck, means for locking said chuck, and means operated by the chuck whereby a complete rotation of the chuck will cause the stopping of the machine.

17. In a gear cutter, reciprocating carriages, tool carriers carried thereby to reciprocate therewith, a cover to protect said carriages from chips and provided with openings for said carriers, means connecting said carriers and said cover whereby said carriers will have play with relation to said cover and said openings will be closed to the passage of chips therethrough.

LOREN W. PENNEY.

Witnesses:
GEORGE O. G. COALE,
M. E. FLAHERTY.